United States Patent
Lundh et al.

(10) Patent No.: US 6,577,872 B1
(45) Date of Patent: Jun. 10, 2003

(54) BASE STATION OSCILLATOR REGULATION INDEPENDENT OF TRANSPORT NETWORK CLOCKS IN CELLULAR TELECOMMUNICATIONS NETWORK

(75) Inventors: Peter Lundh, Skärholmen (SE); Per Konradsson, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 443 days.

(21) Appl. No.: 09/634,763

(22) Filed: Aug. 8, 2000

(51) Int. Cl.⁷ .................. H04B 15/00; H04B 7/005; H04B 7/01; H04B 7/015
(52) U.S. Cl. .................. 455/502; 370/503; 370/350; 375/356
(58) Field of Search ................. 455/422, 502, 455/503; 370/324, 509, 350, 448, 347, 503, 512, 479, 516, 310.2, 412, 342, 515; 375/356, 367; 331/10, 16, 17

(56) References Cited

U.S. PATENT DOCUMENTS

| | | | |
|---|---|---|---|
| 4,337,463 A | 6/1982 | Vangen | |
| 4,521,897 A | 6/1985 | Merrell | |
| 4,622,665 A | 11/1986 | Jonsson et al. | |
| 5,023,572 A | * 6/1991 | Caldwell et al. | 331/10 |
| 5,245,634 A | 9/1993 | Averbuch | |
| 5,388,102 A | 2/1995 | Griffith et al. | |
| 5,473,668 A | 12/1995 | Nakahara | |
| 5,586,119 A | * 12/1996 | Scribano et al. | 370/350 |
| 5,590,160 A | * 12/1996 | Ostman | 375/367 |
| 5,663,715 A | 9/1997 | Godoroia | |
| 5,801,783 A | * 9/1998 | Ross | 455/502 |
| 5,872,820 A | 2/1999 | Upadrasta | |
| 5,912,886 A | 6/1999 | Takahashi et al. | |
| 5,920,557 A | 7/1999 | Hirata | |
| 6,230,021 B1 | * 5/2001 | Ohdachi | 455/502 |
| 6,373,834 B1 | * 4/2002 | Lundh et al. | 370/350 |
| 6,504,845 B1 | * 1/2003 | Petersen et al. | 370/412 |

FOREIGN PATENT DOCUMENTS

| | | |
|---|---|---|
| EP | 0 253 096 A2 | 1/1988 |
| EP | 0 385 134 | 9/1990 |
| GB | 2 300 789 A | 11/1999 |
| WO | WO 99/33207 | 7/1999 |
| WO | WO 99/44287 | 9/1999 |

OTHER PUBLICATIONS

U.S. patent application S.N. 09/095,585 filed Jun. 11, 1998.
U.S. patent application S.N. 09/257,233 filed Feb. 25, 1999.
U.S. patent application S.N. 09/443,208 filed Nov. 18, 1999.

* cited by examiner

Primary Examiner—Thanh Cong Le
Assistant Examiner—Andrew T Harry
(74) Attorney, Agent, or Firm—Nixon & Vanderhye P.C.

(57) ABSTRACT

Synchronization is effected in a cellular telecommunications network between a timing unit located at control node (e.g., RNC) of the network and a slave timing unit (STU) located at a controlled node (e.g., base station) of the network. Upon determining that a synchronization adjustment of the slave timing unit is necessary, an adjustment signal (e.g., voltage signal) is caused to be input to the oscillator of the slave timing unit in order to change the frequency of the slave's oscillator. Frame counter(s), in communication with the oscillator at the slave timing unit, will thus follow the oscillator continuously with smooth phase adjustments. By avoiding a direct adjustment of the frame counter(s), undesirable phase jumps or steps are avoided that can potentially disturb the air-interface between a base station and mobile station (MS).

39 Claims, 7 Drawing Sheets

SFN Phase adjustments in BS using
gives SFN phase jumps during operation if ref$_1$<>ref$_2$

*Fig. 5*

SFN Frequency regulation in BS using
gives no SFN phase jumps during operation

BASE STATION OSCILLATOR REGULATION INDEPENDENT OF TRANSPORT NETWORK CLOCKS IN CELLULAR TELECOMMUNICATIONS NETWORK

BACKGROUND AND FIELD OF THE INVENTION

The present invention pertains to cellular telecommunications, and particularly to synchronization of nodes in a cellular network such as a code division multiple access (CDMA) cellular network. In particular, certain embodiments of this invention relate to a system and corresponding method for adjusting the oscillator of a slave node in order to avoid and/or reduce potential phase jumps or steps associated with directly adjusting a frame counter of that slave node.

RELATED ART AND OTHER CONSIDERATIONS

This application is related to commonly owned U.S. patent application Ser. No. 09/095,585, filed Jun. 11, 1998 (atty. ref. 2380-5), U.S. Ser. No. 09/257,233, filed Feb. 25, 1999 (atty. ref. 2380-94), and U.S. Ser. No. 09/443,208, filed Nov. 18, 1999 (atty. ref. 2380-113), the disclosures of which are all hereby incorporated herein by reference.

In mobile telecommunications, a mobile station (MS) such as mobile cellular telephone, communicates over radio channels with base station(s) (BS or BTS). Typically a plurality of base stations are connected by an upper node, such as a radio network controller (RNC), to a mobile switching center (MSC). The mobile switching center (MSC) is usually connected, e.g., via a gateway, to other telecommunication networks, such as the public switched telephone network (PSTN).

In a code division multiple access (CDMA) mobile telecommunications system, the information transmitted between a base station and a particular mobile station is modulated by a code (such as channelization and/or scrambling codes) to distinguish it from information for other mobile stations which are utilizing the same radio frequency band(s). Thus, in CDMA, individual radio links are discriminated on the basis of codes.

In CDMA systems, on the downlink (e.g., from the base station(s) to a MS) the same baseband signal with suitable codes is typically sent from several base stations with overlapping coverage at approximately the same time to a particular MS(s). In other words, frames with equal user data are sent from different base stations at approximately the same time on the downlink to the mobile station. The MS can thus receive and use signals from several base stations simultaneously. Since the radio environment changes rapidly, an MS likely has radio channels to several base stations at the same moment, e.g., so that the MS can select or combine the best channel and, if necessary, use signals directed to the MS from various base station(s) in order to keep radio interference low and capacity high. This selection procedure in a MS among frames from different base stations enables optimization of the quality of the MS-BS connection.

As for the uplink (e.g., from the MS to BS(s)), user data sent in frames from the MS is often received in multiple BSs. Frame identities are typically attached to uplink frames that are received by base station(s), so as to enable selection by an upper node (e.g., RNC) of one of a plurality of signals received from an MS at approximately the same time at different base stations. While interference is kept low, the BS having the best quality reception of the signal of the MS may randomly change during the course of the connection. Therefore, an upper node such as a radio network controller (RNC) may select the best quality one(s) of the comparable number of frames received from the mobile station by the different base stations diversity combining.

This utilization of radio channels between multiple base stations and a MS in a CDMA scheme, as summarized above, is known as "soft handover" in that different frames may be selected as a function of reception quality, strength, or the like.

The principles of diversity combining and soft-handover require that the base stations participating in a particular connection be synchronized relative to the upper node, e.g., to the RNC. Synchronization is required since, among other things, the plural base stations participating in a connection must send the same frame information at the same time to the MS involved in the connection.

A way to identify frames in the downlink and uplink directions is to attach a sequence number to each frame. In the downlink, sequence numbers can be correlated in the base stations against a reference timing/numbering in order to align frames to intended transmission time (air interface). In the uplink, sequence numbers (related to base station reference timing/numbering) can be attached to frames in each base station before transfer to the RNC (where diversity combining/selection is done based on these numbers).

As can be seen from the above, there exists a need in the art for efficient alignment of timing in different base stations and/or RNC(s) in order to enable reliable soft handover operations.

Typically, timing systems at nodes such as RNCs and BSs have frame counters driven by respective oscillators. Unfortunately, oscillators tend to experience "drift" over time (e.g., how many seconds, or fractions of seconds, they drift over a month or year). Drift may be caused by aging, temperature, voltage instability, or the like. Drift is unitless and tends to be described in terms of "ppm" (parts per million) or "ppb" (parts per billion). For example, 20 ppb means that the frequency uncertainty is +/−20 cycles per one billion nominal cycles. Oscillator drift is one reason why timing systems in respective BS nodes need to be periodically adjusted so as to fulfill air-interface radio requirements and phase drifting requirements so as to stay in sync with a master timing unit such as at a controlling RNC node.

In some systems such as WCDMA or DS-CDMA cellular networks, an upper node (e.g., RNC) has a master system frame counter which is locked to an external reference or clock source. It is desirable for such systems to have a procedure capable of synchronizing base stations so that base stations are substantially phase stable in time (i.e., to avoid substantial phase drifting by base stations). Avoiding/reducing substantial BS phase drift reduces the likelihood of BSs drifting apart in phase during a connection with a particular MS. In other words, it is desirable to keep BSs phase stable enough to prevent one or more BSs from substantially drifting apart during a connection with a MS (when the MS is connected via several BSs). It is thus desirable to achieve a substantially common frame counter and/or a substantially phase stable frame counter in the entire cellular system to make it easier to determine offset values which are to be used in securing radio frames. In situations where a network (e.g, WCDMA network) need not have an absolute phase in the entire system but instead desires substantially phase stable nodes, only substantially phase stable frame counter(s) are desired. This achieves short delays and ensures that the same frames are sent on the downlink in macro-diversity and that the same frames are combined on the uplink in a diversity handover unit (DHT).

It is known that frame counters in base stations may need to be adjusted periodically. In a CDMA system where each user channel includes a number of chips per coded information bit (different numbers of chips may be used depending upon the spreading factor used and/or on the number of users), the chip sequence must be adjusted whenever the frame counter is adjusted. Unfortunately, as discussed more fully below, phase jumps tend to occur upon directly adjusting a frame counter which in turn can lead to dropped call(s).

Commonly owned WO 99/33207 discloses a synchronization system for a cellular telecommunications network. A master timing unit is provided at a control node and a slave timing unit at a base station. When it is determined that an adjustment is necessary, the master timing unit transmits a synchronization adjustment signal to the slave timing unit so that the "counter" at the base station is adjusted accordingly, while keeping the oscillator at the base station untouched.

Unfortunately, the direct frame counter adjustment in WO 99/33207 is problematic in that it can lead to hardware phase adjustment problems. For example, direct adjustment of the counter can often lead to phase jumps/steps which negatively impact the air-interface (e.g., calls could be dropped). In other words, when adjusting the frame counter directly it can be tricky to adjust all logic to the new desired phase in a disturbance-free manner (e.g., algorithms may have problems finding the new phase).

What is needed therefore, and an object of the present invention, is an accurate and reliable technique for synchronizing timing units, such as timing units at base stations, with an upper node in a manner so as to avoid the potential hardware phase adjustment problems (e.g., phase jumps/steps) of the frame counter adjustment method of WO 99/33207.

BRIEF SUMMARY OF THE INVENTION

Synchronization is effected in a cellular telecommunications network between a timing unit located at control node (e.g., RNC) of the network and a slave timing unit (STU) located at a controlled node (e.g., BS) of the network. Upon determining that a synchronization adjustment of the slave timing unit is necessary, an adjustment signal (e.g., voltage signal) is caused to be input to the oscillator of the slave timing unit in order to change the frequency of the slave's oscillator. Frame counter(s), in communication with the oscillator at the slave timing unit, will thus follow the oscillator continuously with smooth phase adjustments. By avoiding a direct adjustment of the frame counter(s), undesirable phase jumps or steps are avoided that can potentially disturb the air-interface between a base station and mobile station (MS). Thus, a goal of achieving a substantially phase stable frame counter(s) can be realized, and in certain embodiments the likelihood of a BS drifting apart in phase relative to another BS connected to the same MS is reduced.

According to one exemplary and non-limiting embodiment, an initiating one of the master timing unit and the slave timing unit transmits a synchronization analysis command message including a first parameter (e.g., $t_1$) to a responding one of the master timing unit and the slave timing unit. In response, the responding timing unit sends a synchronization analysis response message which includes at least second parameter (e.g., $t_2$) and preferably a third parameter (e.g., $t_3$) to the initiating timing unit. The initiating timing unit uses e.g., parameters extracted from the synchronization analysis response message to determine a synchronization adjustment value for the slave timing unit. In certain embodiments, the master timing unit transmits the synchronization adjustment value in a synchronization adjustment command message to the slave timing unit. The slave timing unit calculates and performs the adjustment by inputting an adjustment signal (e.g., a voltage signal) to the oscillator of the slave timing unit, and then notifies the master unit.

In one exemplary non-limiting embodiment, the first parameter included in the synchronization analysis command message may be a first time stamp value $t_1$ related to the time that the synchronization analysis command message is transmitted from the initiating timing unit to the responding timing unit. The second parameter, inserted in the synchronization analysis response message by the responding timing unit, may be a second time stamp value $t_2$ related to the time that the synchronization analysis command message is received at the responding timing unit. The third time stamp value $t_3$, also inserted in synchronization analysis response message by the responding timing unit, may be related to the time that the synchronization analysis response message is sent from the responding timing unit. The initiating unit determines a fourth time stamp value $t_4$ indicative of a time of reception of the synchronization sequence response message at the initiating timing unit.

In an exemplary embodiment where the initiating unit is the master unit, the initiating timing unit may determine the synchronization adjustment value by comparing the second parameter $t_2$ included in the synchronization analysis response message with a predicted second parameter $t_{2\text{-}predicted}$. The predicted second time stamp value $t_{2\text{-}predicted}$ may be determined as $t_{2\text{-}predicted}=((t_1+t_4)/2)-((t_3-t_2)/2)$. The synchronization adjustment value may then be determined as $t_{2\text{-}predicted}-t_2$. However, when the initiating unit is the slave timing unit, the initiating timing unit may determine the synchronization adjustment value by comparing the first parameter $t_1$ included in the synchronization analysis response message with a predicted first parameter $t_{1\text{-}predicted}$. The predicted first time stamp value $t_{1\text{-}predicted}$ may then be determined as $t_{1\text{-}predicted}=((t_2+t_3)/2)-((t_4-t_1)/2)$. The synchronization adjustment value may then be determined as $t_{1\text{-}predicted}-t_1$. The parameters $t_1$ through $t_4$ are preferably values of system frame counters. In particular, the parameters $t_1$ and $t_4$ are then-current values of a system frame counter of the initiating timing unit. The parameters $t_2$ and $t_3$ are then-current values of a system frame counter of the responding timing unit. The synchronization adjustment value is used to adjust the frequency of the oscillator of the timing unit at, e.g., the slave node (e.g., BS).

In different embodiments, the master timing unit can be located in a control node such as an RNC, or even in a mobile switching center (MSC). The slave timing unit can be located in a BS, or alternatively in the control node (such as in a diversity handover unit situated at the control node). Thus, the aforesaid explanation(s) of time stamps applies to different embodiments of this invention, regardless of whether or not the master timing unit is in a control node (e.g., RNC) or controlled node (e.g., BS), and regardless of whether or not the initiating node is the master timing unit, a slave timing unit, at a control node, and/or at a controlled node. Accordingly, a hierarchy is possible of master timing units (MTUs) and slave timing units (STUs) (e.g., an exemplary hierarchy could be MSC-RNC1, RNC1-RNC2, RNC2-BS, etc.).

Accordingly, certain embodiments of the instant invention result in one or more of the following advantage(s). First, by directly adjusting the oscillator instead of the frame counter (e.g., at the BS), undesirable phase jumps or steps can be avoided or reduced so as to maintain an adequate air-interface. Second, certain embodiments enable oscillator(s) to be adjusted automatically, without maintenance personnel having to physically visit BS sites for that reason (i.e., manual oscillator adjustments can be reduced and/or avoided). Third, manual oscillator adjustments can be avoided or reduced for BS oscillators that are locked to a transport network. Fourth, the clock in the BS is adjusted without having to rely solely on the transport network which can experience clock uncertainty. Fifth, the synchronization system/method is decoupled from the transport network principle (e.g., ATM, IP, or FR), where the availability of a network synchronization reference in some networks is/are questionable. Sixth, phase drifting in nodes such as base stations can be reduced and/or corrected, and thus the likelihood of a base station (one of a plurality of BSs on that connection with a particular MS) drifting apart in phase from other base stations on a given connection is reduced.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
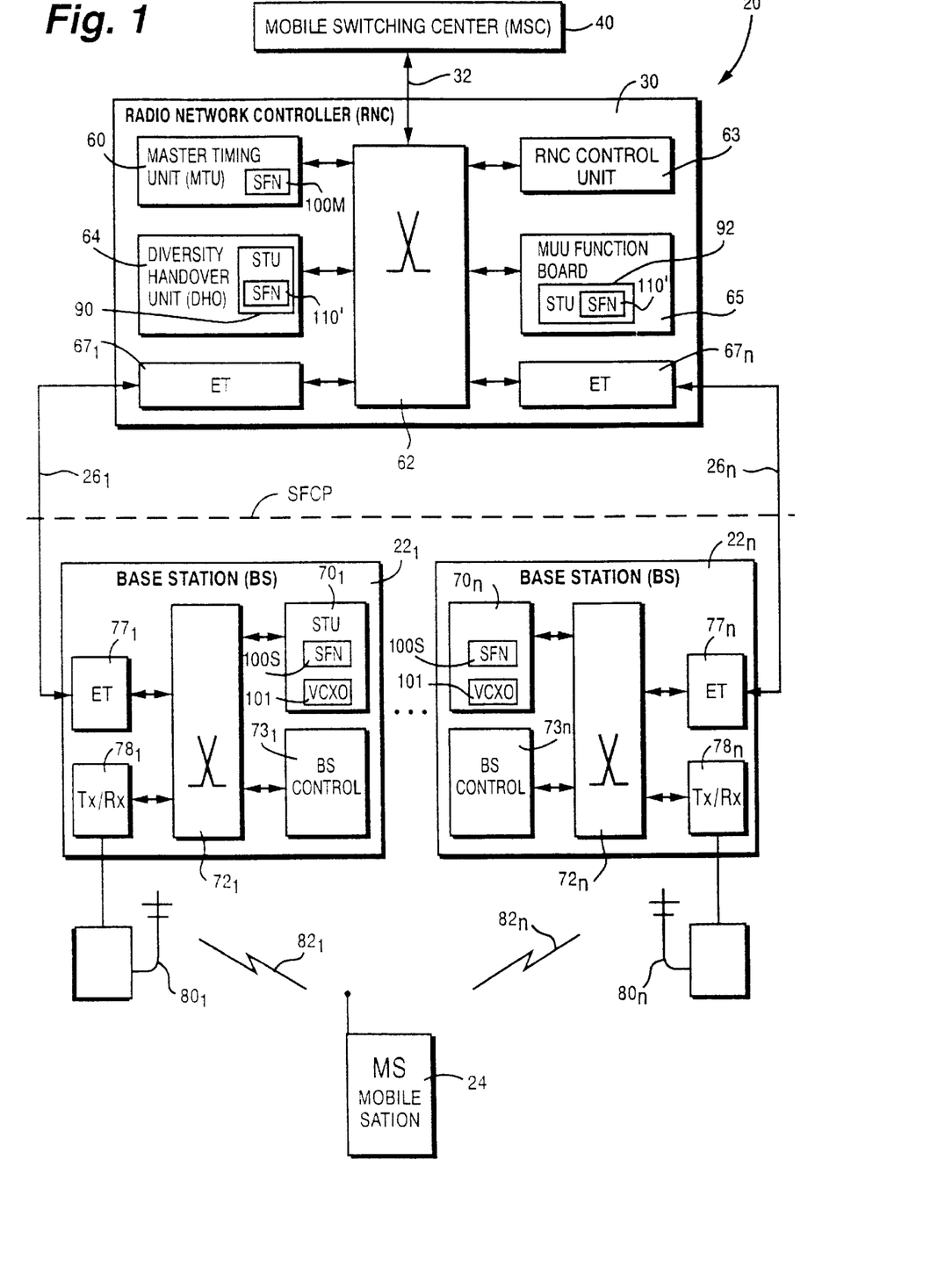
FIG. 1 is a schematic view of a cellular telecommunications network according to an embodiment of the invention.

FIG. 1 shows a cellular telecommunications system/network 20 which includes plural base stations (BSs) $22_1$ through $22_n$ through which a mobile connection is established over the air interface with a mobile station (MS) 24. Base stations $22_1$, through $22_n$, are connected by landlines $26_1$ through $26_n$, respectively, to a radio network controller (RNC) 30. RNC 30 is, in turn, connected by landline 32 to a mobile switching center (MSC) 40. The MSC 40 is usually connected, e.g., via a gateway, to other telecommunication networks, such as the public switched telephone network (PSTN). The gateway is often implemented by using a Gateway MSC (GMSC), which houses the gateway.

Base stations $22_1$ through $22_n$, radio network controller 30, and mobile switching center 40 are each considered to be "nodes" of cellular telecommunications system 20. Radio network controller 30 is particularly considered to be a control node or "upper" node for base stations $22_1$ through $22_n$ while base stations $22_1$ through $22_n$, are considered to be "controlled" nodes relative to RNC 30. RNC 30 can be a node sometimes referred to as a base station controller (BSC).

RNC 30 has a master timing unit (MTU) 60 which is utilized to establish synchronization with a plurality of slave timing units (STUs). As discussed below, the MTU may receive clock signals from a reference timing source (e.g., oscillator) with which it is in communication, or from an STU belonging to a set of MTU/STU(s) on a hierarchical higher level. As exemplified hereinafter, a slave timing unit (STU) is provided in each of base stations $22_1$ through $22_n$, as well as in various components of RNC 30. In the illustrated embodiment, master timing unit (MTU) 60 and the slave, timing units (STUs) in base stations $22_1$ through $22_n$, are provided on dedicated circuit boards known as timing unit boards (TUBs). Slave timing units situated at radio network controller (RNC) 30 are provided on multi-function circuit boards (AMBs) 65.

In the particular embodiment shown in FIG. 1, both RNC 30 and base stations $22_1$, through $22_n$ are nodes which utilize Asynchronous Transfer Mode (ATM) cells. In this regard, RNC 30 has an ATM switch core 62. Core 62 has a plurality of switch core ports which are connected to corresponding circuit boards. In addition to the circuit board upon which MTU 60 resides, ATM switch core 62 is connected via its respective switch core ports to circuit boards hosting an RNC control unit 63; a diversity handover unit (DHO) 64; a multifunction board 65; and a plurality of extension terminals (ETs) $67_1$–$67_n$. The extension terminals (ETs) $67_1$–$67_n$ of RNC 30 are utilized to form ATM connections over landlines or links $26_1$ through $26_n$, respectively, to base stations $22_1$ through $22_n$. All ATM-based nodes of the illustrative network 20 of FIG. 1 are connected to other ATM-based nodes over ATM links. These ATM links are terminated in an extension terminal (ET) in each node. Thus, although not shown as such, link 32 from MSC 40 is terminated in an extension terminal of RNC 30.

The ATM-based base stations $22_1$ through $22_n$ each have slave timing units (STUs) $70_1$ through $70_n$ which are connected to base station ATM switch cores $72_1$, through $72_n$, respectively. Each base station (BS) 22 has a base station controller 73 provided on a circuit board which connects to a port of its corresponding ATM switch core 72. As mentioned before, each base station 22 is connected to RNC 30 by a landline 26, the landline 26 being terminated in an exchange terminal (ET) 77 of base station 22. In addition, each BS 22 has one or more transceiver boards 78 connected to its ATM switch core 72. For simplicity, each of base stations $22_1$ through $22_n$, is shown as having one transceiver board 78, but more than one transceiver board 78 is likely provided for each BS 22. Each transceiver board 78 is connected to an appropriate antenna 80 for emitting signals to MS 24 over the air interface. Typically, power amplifier(s) (not shown) is also provided at each BS, with several Watts output in the Tx direction and a low noise amplifier in the Rx direction. Thus, in FIG. 1, a connection with MS 24 involving base stations $22_1$ through $22_n$ includes air links $82_1$ through $82_n$, between MS 24 and antennae $80_1$ through $80_n$, respectively.

The illustrated network 20 of FIG. 1 may be a code division multiple access (CDMA) network which employs diversity or soft handover in certain embodiments of this invention. In this regard, on the uplink from MS 24 to RNC 30, frames including the same user data are received at each of base stations $22_1$ through $22_n$, through which the mobile connection is established. The frames received at each BS 22 are given a certain quality rating and a system frame count value. The system frame count value is assigned by the STU 70 of the receiving BS 22. The frame, together with its quality rating and system frame count value, is are encapsulated in an ATM cell. The frame-bearing ATM cells are routed through the exchange terminal 77 of the base station 22 and over link 26 to RNC 30.

At RNC 30, the frame-bearing ATM cells are received at the corresponding extension terminal (ET) 67, and are routed through ATM switch core 62 to diversity handover unit 64. At DHO 64, frames containing the same user data from each of base stations $22_1$ through $22_n$ are combined or selected, so that the frames having the best quality are ultimately forwarded (through ATM switch core 62) to mobile switching center (MSC) 40. The MSC 40 has different service adaptation devices, for example a coder-decoder for voice or other adaptation devices for packet data and circuit data.

In RNC 30, frames from differing BSs 22 are assessed as having the same user data if the frames have the same system frame counter value. Hence, it is important that the slave timing units of the differing base stations $22_1$ through $22_n$ be synchronized relative to radio network controller 30 so that they will assign or otherwise provide the same system frame counter value to like frames of user data.

The present invention addresses, e.g., the synchronization of master timing unit (MTU) 60 of RNC 30 with the slave timing units 70 of the BS 22. In addition, the instant invention may also apply to synchronization of other slave timing units, such as slave timing units residing at radio network controller 30, with MTU 60. It is noted that the present invention also encompasses other situations, such as a lateral hierarchical situation in which the timing unit of one RNC is designated as a master, and the timing unit of another RNC is designated as a slave. The master-slave hierarchy may be, for example, MSC-RNC, RNC_1-RNC_2, and RNC_2 to its BS(s). As illustrated, MTU 60 at the RNC includes a system frame counter (SFN) 100M (a system frame counter herein may be referred to by either SFN or SFC; both are the same), which is in communication with a reference timing source such as a good oscillator. Meanwhile, the STUs 70 and 90 each include a system frame counter (SFN) 100S and a local source such as oscillator 101 (VCXO). Output from such oscillator 101 drives the SFNs in a known manner.

On the downlink from RNC 30 to a BS 22, frames of user data received from MSC 40 are routed through ATM switch core 62 of RNC 30 to diversity handover unit (DHO) 64. At DHO 64, a frame splitter essentially provides a copy of each frame to each of base stations $22_1$ through $22_n$, participating in the mobile connection with mobile station 24. All copies of a frame on the downlink are provided with the same system frame counter value. On the downlink, the system frame counter value is assigned by a STU 90 which resides in DHO 64 of radio network controller 30.

The copies of the frames generated by the frame splitter of DHO 64 are routed through switch core 62 to the respective extension terminal (ET) 67, for application on the appropriate link(s) 26 to the destination base station(s) 22. At the receiving base station 22 the frame copy is received by the extension terminal 77 and routed through switch core 72 ultimately to transceiver board 78 for application over the air interface. However, the time at which the frame copy is applied to the air interface is dependent upon the value of the system frame counter value relative to a current system frame counter value maintained by slave timing unit (STU) 70 for that BS 22.

From the foregoing, it will be seen that also on the downlink the synchronization of base stations $22_1$ through $22_n$ relative to master timing unit (MTU) 60 is important. Moreover, since the system frame counter value borne by a frame copy on the downlink is assigned by the STU 90 of DHO 64, synchronization of STU 90 relative to MTU 60 is also important.

Additional details of diversity and soft handover are provided e.g., by U.S. patent application Ser. No. 08/979,866 filed Nov. 26, 1997, entitled "Multistage Diversity Handling for CDMA Mobile Telecommunications", and U.S. patent application Ser. No. 08/980,013 filed Nov. 26, 1997, entitled "Diversity Handling Moveover for CDMA Mobile Telecommunications", both of which are incorporated herein by reference.

Figure 2:
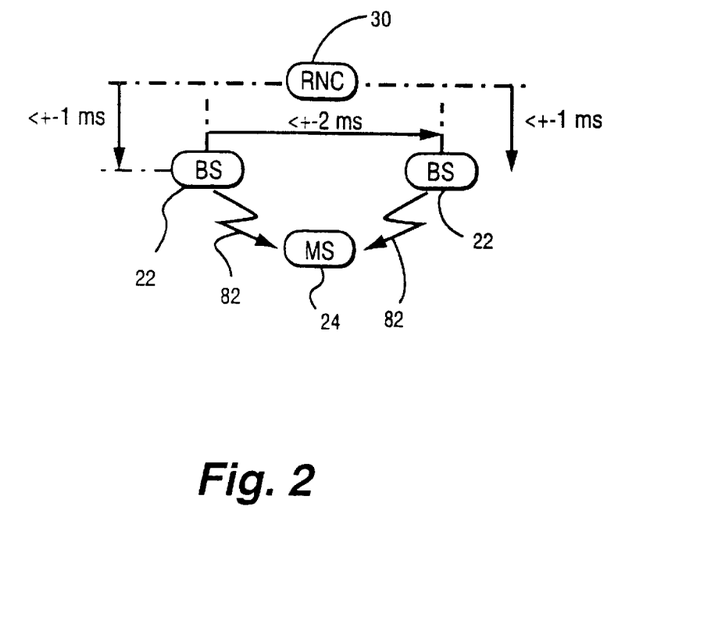
FIG. 2 is a schematic view illustrating a relationship between uncertainties between nodes of the FIG. 1 network.
Figure 3:
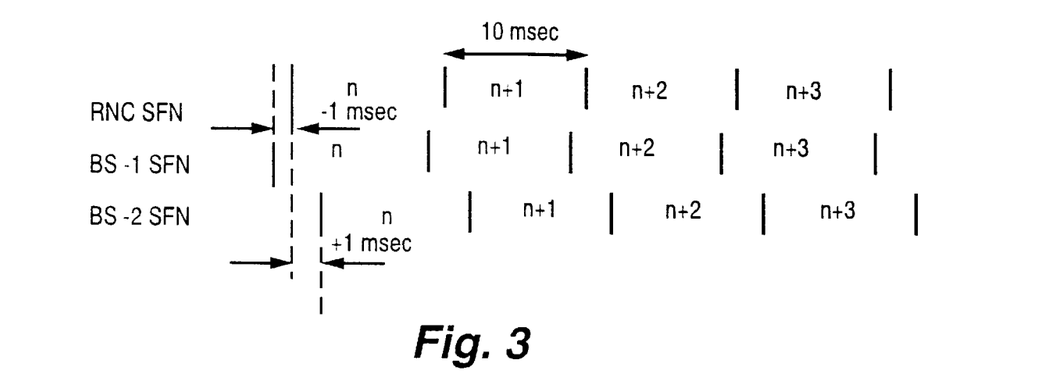
FIG. 3 illustrates an alignment of synchronization errors in RNC and base station nodes.

FIG. 2 illustrates an exemplary relationship between an RNC 30 and a pair of base stations 22 in a system frame number (SFN) perspective. MTU 60 at the RNC 30 maintains the master SFN in certain embodiments, and the SFN value(s) in the BS nodes 22 follow this master. An exemplary goal is to synchronize SFN values in the BS nodes 22 to SFN in the RNC with an uncertainty of maximum +/−1 msec. As shown in FIG. 2, with an uncertainty of no more than about +/−1 msec between the RNC and BS there will be an uncertainty of no greater than about +/−2 msec between different BS nodes 22 with respect to SFN (e.g., compared to a radio frame length of 10 msec.). FIG. 3 illustrates the RNC SFN phase and two BS nodes 22 with alignment errors of tolerable −1 msec. and +1 msec. respectively. However, as explained above, a common frame counter is not required in all embodiments, and in networks such as WCDMA networks which simply desire substantially phase stable counters as they are used as references, a goal is to avoid phase drifting at timing units such as BS timing units.

Figure 4:
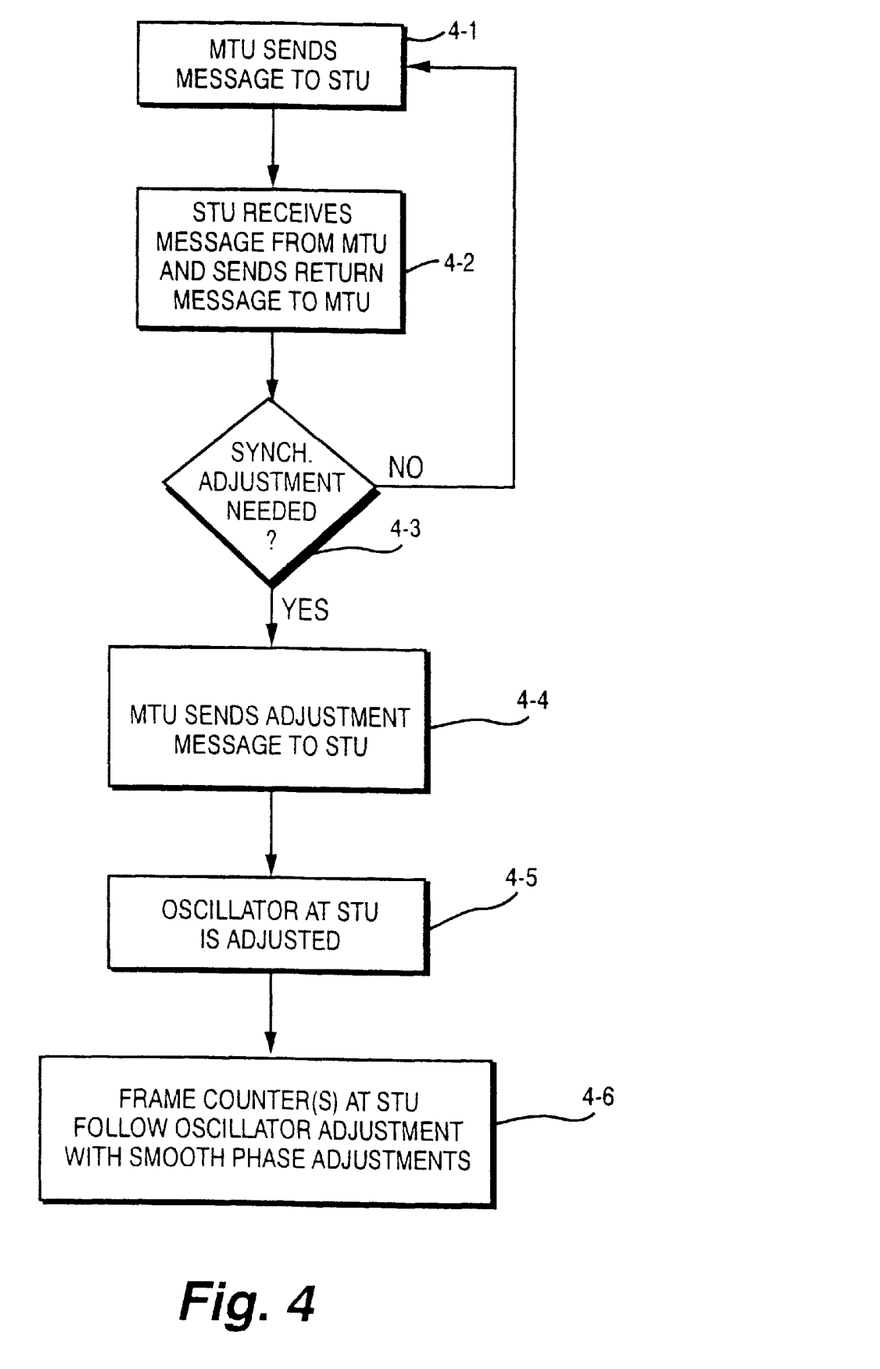
FIG. 4 is a flowchart illustrating certain steps taken in accordance with an embodiment of this invention.

FIG. 4 is a flowchart illustrating certain exemplary steps taken in accordance with an embodiment of this invention. Initially, it must be determined whether a synchronization adjustment is needed in a particular STU (e.g., in a STU 70 of a base station node 22). Such a determination may be made in accordance with the System Frame Counter Protocol (SFNP) of WO 99/33207 which utilizes a round-trip-delay (RTD) measurement, or by any other suitable technique such as NTP protocol. When the SFNP protocol is utilized, in one exemplary embodiment herein, the MTU (e.g., at an RNC or otherwise located) sends a synchronization analysis command message (e.g., including a first parameter $t_1$) to the STU 70 (e.g., to the STU of a BS 22) at step 4-1. The STU 70 receives the message, stamps it, and returns a message to the MTU in step 4-2 in accordance with the SFNP (same as SFCP) procedure outlined in WO 99/33207. Thereafter, the MTU determines at step 4-3 whether or not synchronization at the STU needs to be adjusted. If not, then no synchronization adjust signal is output from the MTU and steps 4-1 through 4-3 are eventually repeated. If so, then the MTU sends a synchronization adjust signal to the STU at step 4-4, with the STU thereafter causing the oscillator of the STU to be adjusted accordingly (e.g., a voltage based signal may be input to the oscillator to cause the oscillator's frequency to change in certain embodiments) at 4-5. The frame counter at the STU which is in communication and receiving clock signals from the source oscillator then follows the oscillator's adjustment at step 4-6, with a smooth phase adjustment. By not directly adjusting the frame counter at the STU and instead directly adjusting the oscillator at the STU, undesirable phase jumps or steps are reduced or avoided as the frame counter's phase is indirectly adjusted in a smooth manner via its source oscillator's adjustment.

Figure 5:
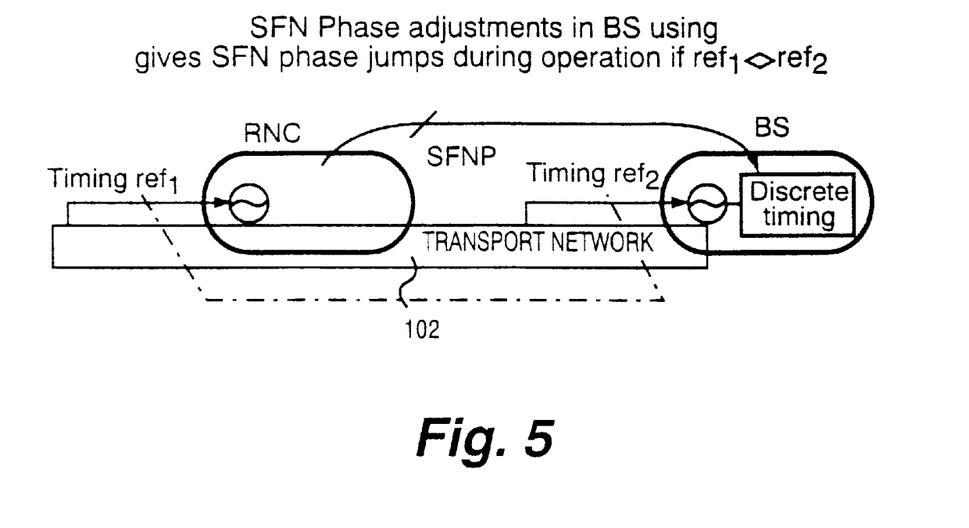
FIG. 5 is a schematic diagram of an RNC adjusting a frame counter of a slave node (e.g., base station).
Figure 6:
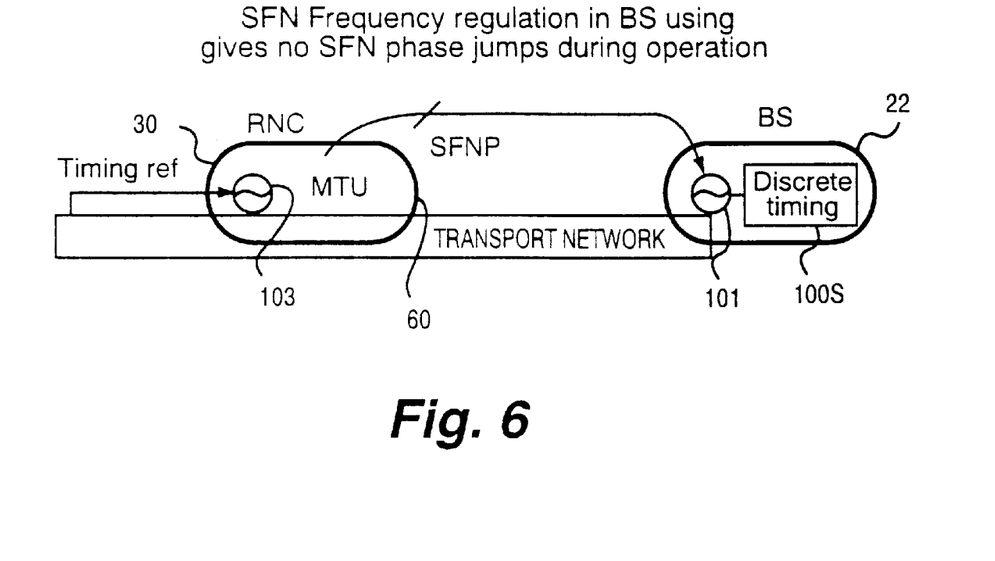
FIG. 6 is a schematic diagram of an RNC adjusting an oscillator of the slave node (instead of the frame counter as in FIG. 5), according to an embodiment of this invention.

With reference to FIGS. 5–6, certain embodiments of this invention (FIG. 6) are compared to embodiments where frame counters are directly adjusted for synchronization purposes (FIG. 5). In FIG. 5, it can be seen that the RNC (e.g., via a SFNP protocol) causes frame counter phase adjustments in the base station via direct frame counter adjustments through the transport network 102. Phase jumps or steps result from this direct frame counter adjustment when the first and second timing references are unequal. However, in accordance with this invention as shown in FIG. 6, RNC 30 receives source timing signals from a source such as an oscillator 103, and the RNC's MTU when needed outputs a synchronization adjustment signal that causes (either directly or indirectly) oscillator 101 at the BS 22 to be adjusted. Thereafter, once oscillator 101 has been adjusted, operation of the system frame counter 100S that it is in communication with at the BS 22 follows without experiencing any substantial phase jumps or steps. Thus, by avoiding direct adjustment of the RFC 100S as shown in FIG. 6, undesirable phase jumps/steps can be avoided or reduce in accordance with certain embodiments of this invention.

Figure 7:
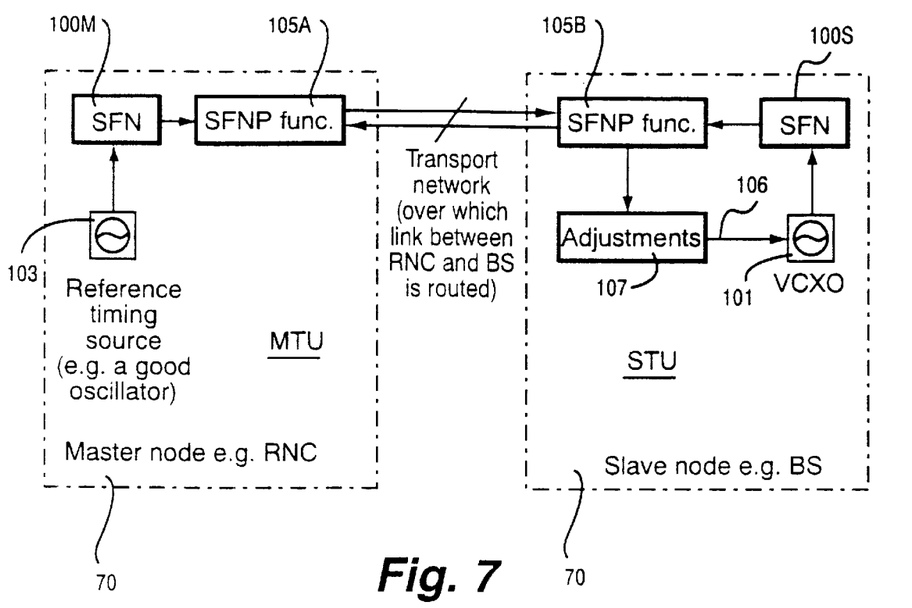
FIG. 7 is a schematic diagram of a master node (e.g., RNC) and controlled slave node (e.g., base station) according to an embodiment of this invention.

FIG. 7 is a schematic diagram illustrating an embodiment of this invention in a simplistic manner in accordance with FIGS. 1–4 and 6. A purpose of the system frame number protocol (SFNP) functions 105A and 105B in the RNC and BS is to at least determine when synchronization adjustment of the BS timing system is required. Thus, the SFNP is working in a between the two nodes. A different SFN counter 100 M, 100S is present in each node, as is an oscillator 101, 103. It is noted that oscillators 101, 103 may be internal to the respective MTU and/or STU, or alternatively may be physically located external relative thereto; in either case they are considered to be part of the MTU/STU because they are in communication with counters thereof.

Still referring to FIG. 7, master node 60 has access to a good reference timing source such as an external network synchronization reference and/or local oscillator 103. SFN 100 M of node 60 is locked to the reference timing source. SFNP 105 measure(s) one and/or two way trip delays between the nodes as discussed in WO 99/33207. When it is determined that an adjustment of the STU timing system is needed, then the MTU outputs an adjust signal that is received by SFNP 105B of STU 70. SFNP then causes oscillator 101 to be adjusted.

The input adjustment signal 106 to oscillator 101 may be a voltage level or other analog based signal in certain embodiments of this invention. A given voltage reflects a certain frequency; thus, the frequency of the oscillator can be changed (or df/dV, i.e., a certain delta V results in a certain delta f). The adjustment signal 106 may be generated via a digital-to-analog (D/A) converter controlled by the same processor that runs SFNP 105B in certain embodiments of this invention (i.e., adjustments function 107 is optional). Alternatively, if higher resolution is needed than what can be achieved from the number of bits from the D/A converter, then alterations between two values can be provided by adjustments function 107 (e.g., using a higher frequency than the filter bandwidth for the oscillator). When SFNP 105B is to provide an adjustment "X" to the oscillator 101, representing an adjustment valid as a measurement result over time T, such figures can be translated into a "ramp" (see FIG. 8) which is reflected by a certain voltage change from the adjustments function 107 (unit is X seconds per T seconds).

Figure 8:
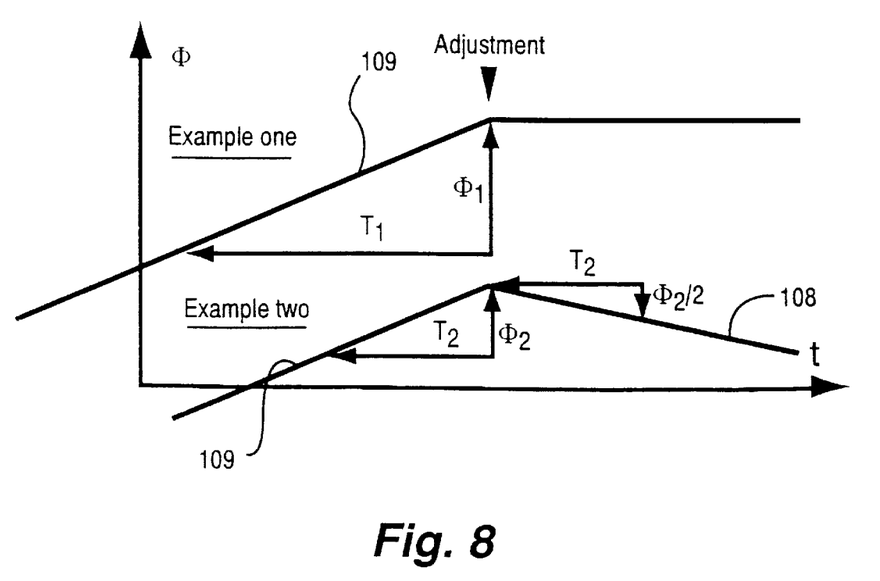
FIG. 8 is a graph illustrating two example types of adjustment signals which may be used to adjust an oscillator in the slave node of FIG. 7 according to this invention.

FIG. 8 is a graph illustrating that oscillator 101 may be adjusted in different manners (i.e., examples one and two in the figure) according to different embodiments of this invention. Measurements performed (e.g., via SFNP between the RNC and BS) may find/detect a phase difference over a period of time (i.e., some type of ramp). This found/detect phase ramp corresponds to a phase drift and thus also a frequency drift. Frequency change at the oscillator gives rise to phase change at the counter. Moreover, an input voltage adjustment signal to the oscillator can change the frequency of the oscillator.

Still referring to FIG. 8, consider the scenario where the system determines that there is an undesirable phase ramp 109 at the remote STU 70 and it is desired to adjust it via the STU's oscillator 101. The adjustment is to be done at the "adjustment" time instant shown in FIG. 8. In accordance with the "example one" embodiment, a voltage level adjustment (e.g., corresponding to the measured ramp or any other suitable parameter and/or algorithm) is input to oscillator 101 which reflects a measurement of period $T_1$. The input ramp value to the oscillator 101 in the inverse value of what is measured over $T_1$. This results in the frequency being stabilized but not reaching the same phase the timing system started off with. In other words, in example one the system stops the phase ramp at the STU and corrects same so as to substantially eliminate the phase ramp so that desynchronization will not continue to get worse.

However, in the "example two" embodiment of FIG. 8, the system not only corrects the undesired phase ramp 109 but adjusts the oscillator 101 so as to cause a phase ramp 108 to be created at the STU that slopes in the opposite direction as undesired ramp 109 (i.e., attempting to reach a phase closer to that which the system started with). Thus, in the example two embodiment, an absolute phase error less than that of the example one embodiment is obtained for a period of time. In the long term, the downward sloping phase ramp 108 at the STU will be inverted (creating a zig-zag phase ramp pattern that preferably becomes smaller and smaller over a period of time) so as to keep crossing the desired phase value. In still further embodiments of this invention, any other suitable filter algorithm could be used in the adjustments function 107 in order to correct phase error (e.g., to perform measurements over time for making SFNP measurement uncertainties small compared with ramp adjustments).

The aforesaid oscillator adjustment process may be performed periodically at different or the same intervals over time in different embodiments of this invention. This invention is clearly not limited to how often or when such adjustments are performed. However, as an example of how often regulation should or may be performed, consider the following exemplary circumstances: (1) round trip delay (RTD) gives a resolution of +/−5 ms for the BS clock phase compared to that of the RNC clock phase; (2) the BS oscillator 101 has a long term uncertainty of 0.05 ppm; (3) it is desired to have ten times higher precision for the RTD measurements compared to measured clock phase difference. These assumptions give rise to the questions of how long should the system wait between adjustments, and how long of a period is 50 ms compared to 50 ppb? The result is:

$$50 \times 10^{-3} / 50 \times 10^{-9} = 1 \text{ Ms} = 12 \text{ days}$$

Thus, the system could adjust the BS oscillator 101 every two weeks or so if desired. As some BS oscillators conventionally must be adjusted two times a year by having people travel around to different BS nodes and manually adjust the oscillators, it can be seen that this invention does away with that conventional requirement and permits automatic oscillator adjustment. As another example in view of the above, if the RTD uncertainty precision is very bad (e.g., 20 ms instead of 5 ms), then the period could be extended to ten times 20 ms divided by 50 ppb which is $0.2 \text{ s}/0.05 \mu = 4 \text{ Ms} = 2$ months.

Figure 9:
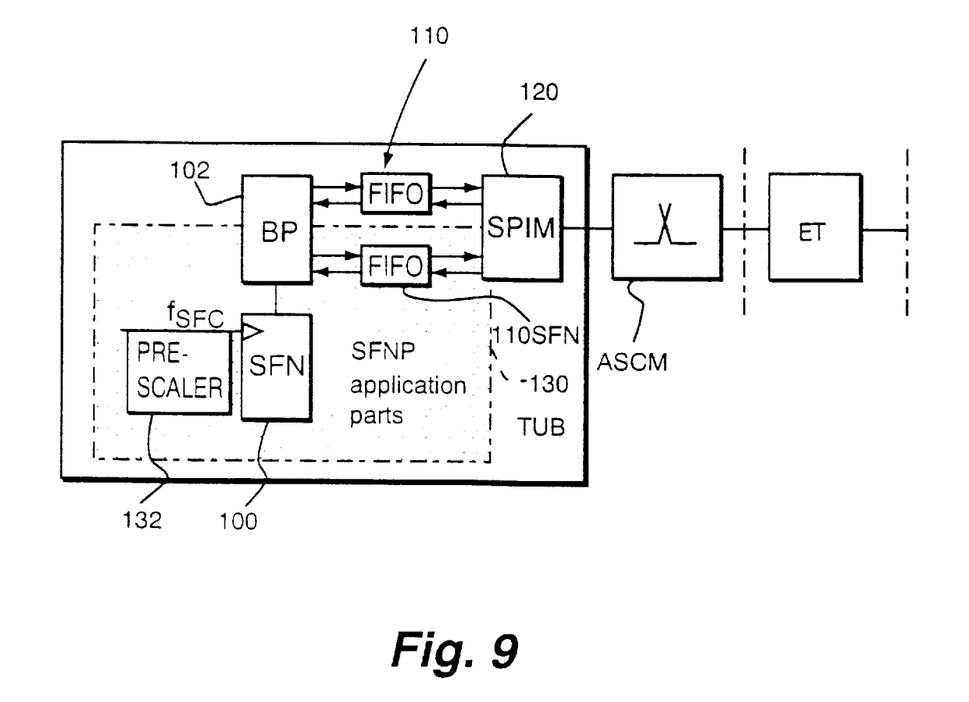
FIG. 9 is a schematic view of a portion of a node having a timing unit of an embodiment of the invention located on a timing board.

To provide further understanding of exemplary embodiments of this invention, structure and functionality of exemplary timing units are now discussed. In this regard, FIG. 9 shows a timing unit board (TUB) relative to a switch core and an extension terminal (ET) of a node. The timing unit board (TUB) can be either for master timing unit (MTU) 60 of radio network controller (RNC) 30, or for a slave timing unit (STU) 70 situated at a base station (BS) 22.

The timing unit board (TUB) of FIG. 9 features a system frame counter (SFN) 100 and optionally an oscillator (not shown in this figure for purposes of simplicity). In the illustrated embodiment, system frame counter (SFN) 100 is implemented in hardware, although the implementation alternatively may be at least in part accomplished using a board processor (BP) 102, e.g., a microprocessor. Board processor (BP) 102 is connected through a set 110 of bidirectional FIFO hardware circuits (e.g., buffers) to a switch port interface module (SPIM) 120 to the switch core ASCM. One of the FIFO buffers in set 110, particularly FIFO buffer 110SFN, is a hardware circuit which supports SFNP message handling of processor (BP) 102, and is dedicated for handling synchronization messages between timing unit board (TUB) and other timing units of the network 20. SPIM 120 is, in turn, connected to the appropriate switch core port of switch core ASCM.

A system frame counter-related portion 130 of TUB thus includes not only system frame counter (SFN) 100, but also portions of board processor (BP) 102, the dedicated FIFO buffer 110SFN, and a prescaler 132. The system frame counter (SFN) 100 may includes both a frame fractional counter (FFC) and a frame counter (FRC) in certain exemplary embodiments, to get a fractional resolution of the frame counter.

Although the structure of FIG. 9 pertaining to the present invention is common for all timing unit boards (TUBs) including both master timing unit 60 and slave timing units (STUs) 70, for sake of clarity in FIG. 1 the SFN for MTU 60 has been labeled as system frame counter (SFN) 100M and the SFN for slave timing units 70 have been labeled as system frame counter 100S.

It should be understood that an example having air frames of 10 millisecond in length, a resolution of one chip, and SFN 100 being forty one bits long, is merely illustrative. Other systems having other values are also within the scope of the present invention, such as (for example) a system having 20 millisecond frame length, four chips, and a twenty six bit system frame counter (SFN). Moreover, slave timing units (STUs) can be provided on boards which are not dedicated timing unit boards. One example mentioned above is STU 90 of DHO 64 of RNC 30. Further details relating to these circuits and/or alternatives thereto, as well as message formats, pre-sets, and the like, are provided in WO 99/33207, incorporated herein by reference.

Synchronization procedures herein can be initiated by either a STU or by MTU 60. Whichever timing unit initiates the synchronization procedure of the invention is referred to as the "initiating timing unit (ITU)", with the other timing unit being called the "responding timing unit (RTU)". In a first mode of the invention, the master timing unit (MTU) 60 functions as the ITU.

Figure 10:
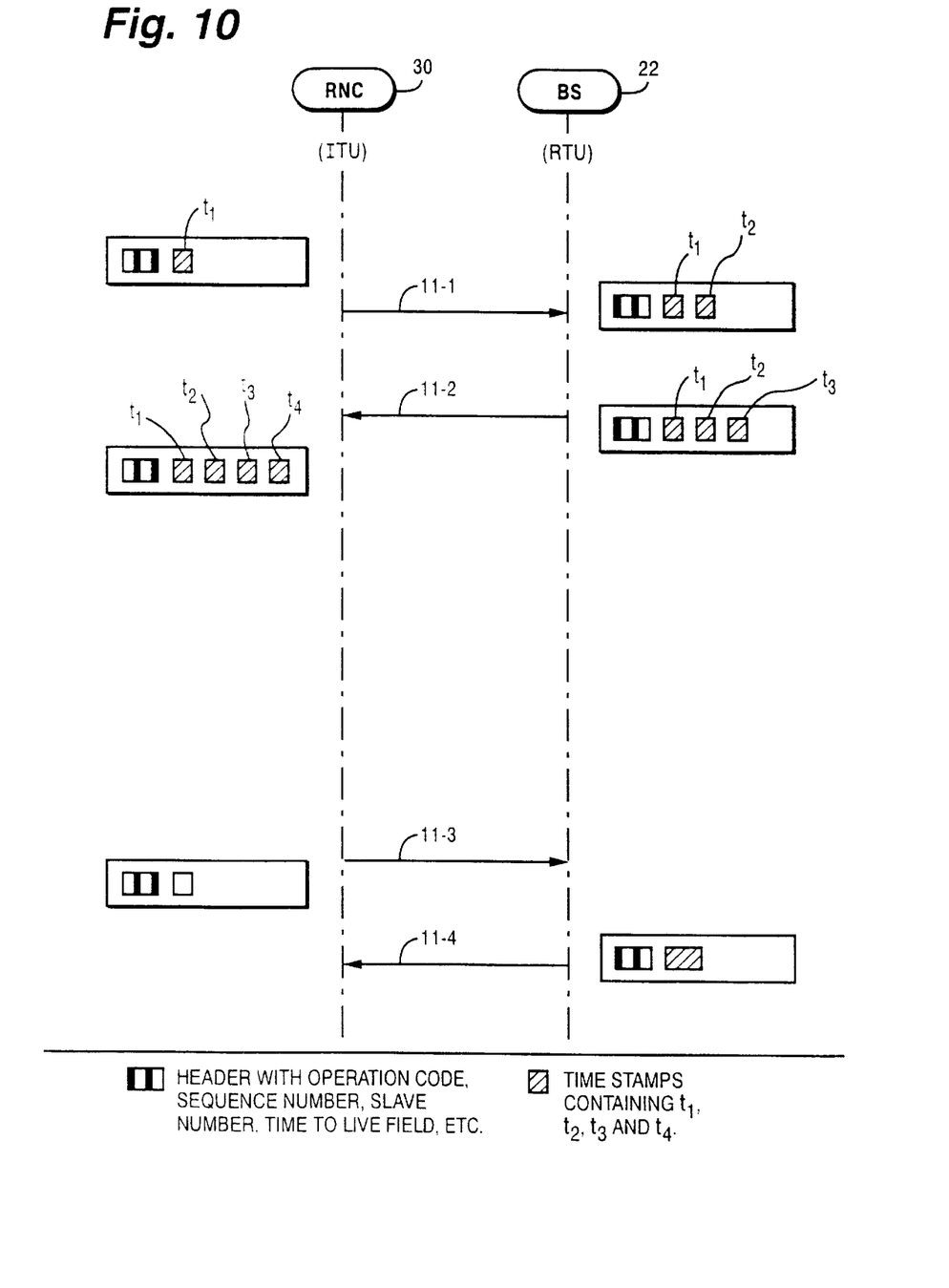
FIG. 10 is a diagrammatic view showing a sequence of synchronization messages transmitted in accordance with SFNP.

With regard to the SFNP protocol which enables the system to determine whether or not synchronization adjustment is needed/required, general steps or operations relating thereto in accordance with a first embodiment of this invention are shown in FIG. 10 which illustrates a SFNP message exchange between, e.g., an RNC and BS. After starting, the ITU (e.g., MTU 60 or RNC 30) sends an ANALYZE_SFC command message to the responding timing unit (RTU) (e.g., the other of the MTU and RNC, that is not the ITU) when requested to do so at step 11-1. The request to send an ANALYZE_SFC command message can be periodic or a periodic as desired, and can occur as a result of a system parameter set up by an operator configuring when and how often the analyzing commands are to be issued. In the illustration of FIG. 10, the addressed slave timing unit (STU or RTU) resides in one of the base stations $22_1$, through $22_n$. The ANALYZE_SFC command message includes a plurality of fields which are used to store certain synchronization-related parameters $t_1$, $t_2$, $t_3$, e.g., time-dependent values of the system frame counter (SFN) for either master timing unit 60 or the addressed STU. As seen below, these synchronization-related parameters $t_1$, $t_2$, $t_3$ essentially serve as time stamps carried by the ANALYZE_SFC command message and the ANALYZE_SFC response message.

When MTU 60 is requested to send a ANALYZE_SFC command message to an addressed slave timing unit, master timing unit 60 inserts into an appropriate field $t_1$ of the ANALYZE_SFC command message the value of its SFN 100 at the time the ANALYZE_SFC command message is sent to the addressed STU. This inserted value of the system frame counter 100 of master timing unit (MTU) 60 is represented by $t_1$. When a synchronization message is received by a slave timing unit, its time of reception is immediately determined, and the time of reception will be required for use as time stamp $t_2$. In the case of the responding timing unit (RTU) being a slave timing unit (STU), the determination of the time is reception is facilitated by the hardware of FIFO buffer 110SFN which, as mentioned above, supports SFNP message handling by a processor. The determination of the time of reception is made by the responding timing unit (RTU) with reference to the current value of its own system frame counter (SFN) 100 when the command message is received. In the case of reception of an ANALYZE_SFC command message, the responding timing unit (RTU) determines the time of reception of the command message which is to be used as time stamp $t_2$. The RTU prepares a ANALYZE_SFC response message which thus far includes, e.g., the time stamp $t_2$. At step—just before the response message is to be dispatched—the responding timing unit (RTU) determines the current value of its own system frame counter (SFN) 100S, i.e., at the time the RTU sends an ANALYZE_SFC response message back to initiating timing unit. The value of system frame counter (SFN) 100S of the responding timing unit at the time the responding timing unit sends an ANALYZE_SFC response message is illustrated as $t_3$. Then, the time stamp $t_3$ is included in the ANALYZE_SFC response message sent back to the initiating timing unit (ITU) at step 11-2. The parameter $t_3$ is employed in the event that the processing time is other than negligible. The parameter $t_3$ is added to the ANALYZE_SFC response message as late as possible before the response messages is dispatched. In other words, the last transaction occurring with respect to transmission of the response message is insertion of the $t_3$ value. As shown in FIG. 10, the ANALYZE_SFC response message returned at 11-2 to the ITU includes the three time stamp $t_1$, $t_2$, and $t_3$. These three time stamp values $t_1$, $t_2$, and $t_3$ are stored in different fields, respectively, of the payload of the ANALYZE_SFC response message.

Assuming that an ANALYZE_SFC response message is timely received by master timing unit 60 from the addressed slave timing unit, the master timing unit 60 determines the value of its SFN 100 upon receipt of the ANALYZE_SFC response message. The value of the system frame counter (SFN) 100 of master timing unit 60 upon receipt of the ANALYZE_SFC response message is denoted as $t_4$. Although the value of $t_4$ is not included in the ANALYZE_SFC response message, FIG. 10 shows that master timing unit 60 of radio network controller 30 has this information as well as the values $t_1$–$t_3$ upon receipt of the ANALYZE_SFC response message. Then, master timing unit (MTU) 60 stores each of the values of $t_1$–$t_4$ for the addressed slave timing unit in a log.

The master timing unit (MTU) 60 may use the values contained in the ANALYZE_SFC response message to determine whether the value of the system frame counter (SFN) of the slave timing unit is within a specified range relative to the system frame counter (SFN) of master timing unit 60. The specified range can depend on the nature of the nodes in which the master timing unit 60 and slave timing unit are situated. When the initiating timing unit 60 is a master timing unit 60 in a radio network controller and the responding timing unit is a slave timing unit in a base station, the specified range could extend from plus or minus 2 milliseconds to plus or minus 5 milliseconds, for example. In the case of the initiating timing unit and the responding timing unit being in differing radio network controllers (RNCs), on the other hand, the resolution and specified range is more critical.

For sake of simplicity of discussion, it will first be assumed that the value of the system frame counter for slave timing unit is within the specified range relative to the value of the system frame counter of master timing unit 60. In such case, the master timing unit (MTU) 60 sets a WITHIN_RANGE flag maintained for the addressed slave timing unit (STU) to zero. Then, master timing unit (MTU) 60 determines whether it is time to transmit an ADJUST_SFC command message to the addressed slave timing unit (STU), based upon analysis of one or more ANALYZE_SFC transactions with the STU.

When it is time to send an ADJUST_SFC command message from master timing unit 60 to the addressed slave timing unit (STU), an adjustment value, known as $SFN_{adjust}$, is determined as explained, for example, in WO 99/33207.

The adjustment value $SFN_{adjust}$, which is an offset value, is computed by master timing unit 60 as follows:

$$SFN_{adjust} = t_{2\text{-}predicted} - t_2 \qquad \text{Equation 1}$$

in which $$t_{2\text{-}predicted} = ((t_1+t_4)/2) - ((t_3-t_2)/2). \qquad \text{Equation 2}$$

The value of $t_{2\text{-}predicted}$ is thus premised on the assumption that the uplink delay (UL) and downlink delay (DL) for the ANALYZE_SFC command message are identical. However, if $t_2$ should differ from $t_{2\text{-}predicted}$, the adjustment value $SFN_{adjust}$ is required for the slave timing unit (STU). In optional filtering and averaging embodiments, the values employed in evaluating Equation 1 and Equation 2 are the values determined in accordance with whatever example of filtering and averaging may be employed.

In the first mode of the invention in which the master timing unit (MTU) 60 is the initiating timing unit (ITU), the adjustment offset value, $SFN_{adjust}$, is sent from master timing unit 60 to the addressed slave timing unit (STU) in an ADJUST_SFC command message. Event 11-3 of FIG. 10 shows the ADJUST_SFC command message being transmitted from master timing unit 60 of RNC 30 to the addressed slave timing unit of a base station 22. After decoding of the message at the addressed slave timing unit, the slave timing unit causes its oscillator to be adjusted as set forth above, and forwards an acknowledgement/response message to the ITU indicative of same at 11-4.

It should be understood that the ANALYSIS_SFC response message need not, in other embodiments, include all four time parameters $t_1$ through $t_4$. Rather, in the other embodiments, the responsibility of gathering time parameters such as $t_1$ through $t_4$ can be distributed to more than one command or message. For example, a first command may elicit from the responding timing unit a response message with the time stamps $t_1$ and $t_2$, while a second command obtains a response message with the time stamp $t_3$, for example. Moreover, it should be understood that round trip delay (RTD) measurements need not obtain intermediate time stamps (e.g., $t_2$ and $t_3$) from the responding timing unit if the processing time is negligible at the time unit whereat $t_2$ and $t_3$ would be determined.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, while the nodes of the illustrated embodiment are ATM-based, non-ATM systems in which frames and synchronization messages are sent in other than ATM cells are contemplated (e.g., Frame Relay or any other technique where commands and responses are utilized). Moreover, while the synchronization principles of the present invention are not limited to a master timing unit in a RNC and a slave timing unit in a base station node, as synchronization between other nodes are also envisioned.

What is claimed is:

1. A cellular telecommunications network comprising:
   a master timing unit located at a control node of the network;
   a slave timing unit located at the control node or at a controlled node of the network, the slave timing unit including an oscillator and a frame counter;
   wherein one of the master timing unit and the slave timing unit serves as an initiating timing unit for transmitting a synchronization analysis command message including a first parameter to a responding timing unit, the responding timing unit being the other of the master timing unit and the slave timing unit;

wherein in response to the synchronization analysis command message the responding timing unit sends a synchronization analysis response message including a second parameter to the initiating timing unit;

wherein the initiating timing unit uses the synchronization analysis response message to determine a synchronization adjustment for the slave timing unit; and wherein the oscillator of the slave timing unit is adjusted at least in part based upon the synchronization adjustment determined by the initiating timing unit.

2. The network of claim 1, wherein the initiating timing unit is at a radio network controller (RNC) node and the slave timing unit is at a base station (BS) node of the network.

3. The network of claim 1, wherein a voltage signal is input to the oscillator of the slave timing unit in order to adjust the frequency of the oscillator.

4. The network of claim 3, wherein the frame counter of the slave timing unit, which is in communication with the adjusted oscillator, follows the oscillator continuously with smooth phase adjustments in a manner so as to avoid or reduce phase jumps or steps which could occur if the frame counter was to have been adjusted directly.

5. The network of claim 1, wherein the oscillator is adjusted in a manner so as to reduce a phase ramp in the slave timing unit.

6. The network of claim 1, wherein the oscillator is adjusted in a manner over time so as to cause resulting phase ramps at the slave timing unit to zig-zag back and forth in sloped manners across a desired phase reference.

7. The network of claim 1, wherein the oscillator is adjusted in a manner so as to substantially eliminate a phase ramp at the slave timing unit.

8. The network of claim 1, wherein the oscillator is adjusted in a manner so as to cause an adjustment phase ramp at the slave timing unit which slopes in a direction opposite to a direction of a phase ramp being corrected that existed at the slave timing unit prior to adjustment of the oscillator.

9. The network of claim 8, wherein the adjustment phase ramp has a slope less than a slope of the phase ramp being corrected.

10. The network of claim 9, wherein the adjustment phase ramp has a slope bout one half of the slope of the ramp being corrected.

11. The network of claim 1, wherein the initiating timing unit is the master timing unit, and wherein,the master timing unit transmits the synchronization adjustment in a synchronization adjustment command message to the slave timing unit.

12. The network of claim 1, wherein the initiating timing unit is the slave timing unit, and wherein the slave timing unit uses the synchronization adjustment value to adjust the oscillator of the slave timing unit.

13. The network of claim 1, wherein the initiating timing unit determines the synchronization adjustment value by comparing the second parameter included in the synchronization analysis response message with a predicted second parameter.

14. The network of claim 13, wherein the first parameter is a first time stamp value $t_1$ related to the time that the synchronization analysis command message is transmitted from the initiating timing unit and the second parameter is a second time stamp value $t_2$ related to the time that the synchronization analysis command message is received at the responding timing unit; and wherein the synchronization analysis response message sent by the responding timing unit to the initiating timing unit includes a time stamp value $t_3$ related to the time that the synchronization analysis response message is sent from the responding timing unit, wherein the initiating timing unit determines a time stamp value $t_4$ indicative of a time of reception of the synchronization sequence response message at the initiating timing unit.

15. The network of claim 14, wherein the predicted second parameter is determined by: $t_{2\text{-}predicted}=((t_1+t_4)/2)-((t_3-t_2)/2)$.

16. The network of claim 1, wherein the network is code division multiple access (CDMA) cellular telecommunications network including a diversity handover unit situated at a control node where the initiating timing unit is located.

17. The network of claim 1, wherein the initiating timing unit transmits a series of synchronization analysis command messages and wherein the responding timing unit responsively sends a corresponding series of synchronization analysis response messages, and wherein the initiating timing unit performs at least one of filtering and averaging of parameter values ascertained from the synchronization analysis response messages to determine an appropriate synchronization adjustment value for the slave timing unit.

18. A cellular telecommunications network comprising:
a master timing system including a first frame counter-located at least partially at a control node of the network;
a slave timing system located at least partially at a controlled node of the network, the slave timing system including a second frame counter and an oscillator with which the second frame counter is in communication;
wherein an adjustment signal is automatically input to the oscillator that is in communication with the second frame counter in order to directly adjust the oscillator, herein the adjustment signal is based at least in part upon the synchronization adjustment parameter or value.

19. The network of claim 18, wherein the master timing system is at least partially located at a radio network controller (RNC) node and the slave timing system is at least partially located at a base station (BS or BTS) node of the network.

20. The network of claim 19, wherein the second frame counter follows the oscillator continuously with smooth phase adjustments in a manner so as to avoid or reduce phase jumps or steps.

21. The network of claim 18, wherein the oscillator is adjusted in a manner so as to reduce a phase ramp in the slave timing system that existed prior to adjustment of the oscillator.

22. The network of claim 18, wherein the oscillator is adjusted in a manner over time so as to cause resulting phase ramps at the slave timing system to zig-zag back and forth in sloped manners across a desired phase reference.

23. The network of claim 18, wherein the oscillator is adjusted in a manner so as to substantially eliminate any phase ramp at the slave timing system.

24. The network of claim 18, wherein the oscillator is adjusted in a manner so as to cause an adjustment phase ramp at the slave timing system which slopes in a direction opposite to a direction of a phase ramp that existed at the slave timing system prior to adjustment of the oscillator.

25. The network of claim 24, wherein the adjustment phase ramp has a slope less than a slope of the phase ramp that existed at the slave timing system prior to adjustment of the oscillator.

26. A method of synchronizing respective nodes of a cellular telecommunications network, the method comprising the steps of:
 providing a control node in the cellular telecommunications network;
 providing at least one base station node in the cellular telecommunications network, the base station node including each of a clock source and a frame counter that follows the clock source;
 determining a synchronization adjustment value or parameter based upon at least one message sent between the control node and the base station node; and
 adjusting the clock source of the base station node based at least in part upon the synchronization adjustment parameter or value.

27. The method of claim 26, wherein the clock source comprises an oscillator.

28. The method of claim 27, further comprising adjusting the oscillator over time so as to cause resulting phase ramps at the base station node to zig-zag back and forth in sloped manners across a desired phase reference.

29. The method of claim 27, further comprising adjusting the oscillator so as to substantially eliminate any phase ramp at a timing unit of the base station node.

30. The method of claim 27, further comprising adjusting the oscillator so as to cause an adjustment phase ramp at a timing system in the base station node which slopes in a direction opposite to a direction of a phase ramp that existed at the timing system prior to adjustment of the oscillator.

31. A node adapted to be used in a cellular telecommunications network, the node comprising:
 a clock source;
 a frame counter which is in communication with and follows the clock source;
 a protocol function for participating in a determination of a synchronization adjustment value or parameter; and
 wherein the clock source is automatically adjusted based at least in part upon the synchronization adjustment value or parameter.

32. The node of claim 31, wherein the node is one of a BS node and a RNC node.

33. The node of claim 31, wherein the clock source includes an oscillator, and wherein the oscillator is adjusted in a manner so as to avoid or reduce phase steps or jumps which could have occurred if the frame counter were have to been directly adjusted.

34. The node of claim 31, wherein the clock source is adjusted in a manner over time so as to cause resulting phase ramps at the node to zig-zag back and forth in sloped manners across a desired phase reference in a pattern which reduces in amplitude over a period of time.

35. The node of claim 31, wherein the clock source is adjusted in a manner so as to substantially eliminate any phase ramp at a timing system of the node.

36. The node of claim 31, wherein the clock source is adjusted in a manner so as to cause an adjustment phase ramp at a slave timing system of the node which slopes in a direction opposite to a direction of a phase ramp that existed at the slave timing system prior to adjustment of the clock source.

37. A cellular telecommunications system comprising:
 a master timing unit;
 a slave timing unit including an oscillator and a frame counter;
 wherein one of the master timing unit and the slave timing unit serves as an initiating timing unit for transmitting a synchronization analysis command message including a first parameter to a responding timing unit, the responding timing unit being the other of the master timing unit and the slave timing unit;
 wherein in response to the synchronization analysis command message the responding timing unit sends a synchronization analysis response message including a second parameter to the initiating timing unit;
 wherein the initiating timing unit uses the synchronization analysis response message to determine a synchronization adjustment for the slave timing unit; and
 wherein the oscillator of the slave timing unit is adjusted at least in part based upon the synchronization adjustment determined by the initiating timing unit.

38. The system of claim 37, wherein said master timing unit is located at either of a BS node or an RNC node of the cellular telecommunications system.

39. The system of claim 38, wherein the initiating timing unit is the master timing unit.

* * * * *